United States Patent

Keppeler

(10) Patent No.: US 6,669,923 B2
(45) Date of Patent: Dec. 30, 2003

(54) GAS GENERATOR

(75) Inventor: Berthold Keppeler, Owen (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 185 days.

(21) Appl. No.: 09/796,713

(22) Filed: Mar. 2, 2001

(65) Prior Publication Data

US 2001/0038816 A1 Nov. 8, 2001

(30) Foreign Application Priority Data

Mar. 2, 2000 (DE) ......... 100 10 070

(51) Int. Cl.[7] ............ B01J 7/00; B01J 8/02; C01B 3/02; C01B 3/24; C01B 3/26
(52) U.S. Cl. ........ 423/648.1; 48/61; 48/127.9; 422/190; 422/211; 423/650; 423/651; 423/652
(58) Field of Search ............ 423/648.1, 650, 423/651, 652, 653, 654; 422/190, 211; 48/61, 127.9, 198.7

(56) References Cited

U.S. PATENT DOCUMENTS

| | | | |
|---|---|---|---|
| 3,545,926 A | | 12/1970 | Schlinger et al. ......... 23/213 |
| 4,052,176 A | | 10/1977 | Child |
| 4,594,233 A | * | 6/1986 | Parrish ............ 423/359 |
| 4,946,667 A | * | 8/1990 | Beshty ............ 423/648.1 |
| 5,221,524 A | * | 6/1993 | Eguchi ............ 423/648.1 |
| 5,741,474 A | * | 4/1998 | Isomura et al. ......... 423/648.1 |
| 5,837,217 A | * | 11/1998 | Nielsen et al. ......... 423/648.1 |
| 5,861,137 A | | 1/1999 | Edlund ............ 423/652 |
| 6,048,473 A | * | 4/2000 | Denda et al. ......... 423/648.1 |
| 6,059,995 A | * | 5/2000 | Topsoe et al. ......... 423/648.1 |
| 6,207,122 B1 | * | 3/2001 | Clawson et al. ......... 423/654 |
| 6,264,856 B1 | * | 7/2001 | Autenrieth et al. ......... 423/651 |
| 6,299,853 B1 | * | 10/2001 | Boneberg et al. ......... 423/652 |
| 6,517,805 B1 | * | 2/2003 | Schuessler et al. ......... 423/648.1 |
| 6,565,817 B1 | * | 5/2003 | Kiryu ............ 48/61 |

FOREIGN PATENT DOCUMENTS

| | | |
|---|---|---|
| JP | 05149989 | 6/1993 |
| WO | 00/70697 | 11/2000 |

OTHER PUBLICATIONS

U.S. patent application Publication 2001/0005500 A1, Jun. 28, 2001.*
Copy of the International Search Report.

* cited by examiner

*Primary Examiner*—Wayne A. Langel
(74) *Attorney, Agent, or Firm*—Crowell & Moring LLP

(57) ABSTRACT

A gas generator for generating a hydrogen-rich carbon-monoxide-lean gas from a water-fuel mixture by catalytic steam reforming and/or from an oxygen-fuel mixture by partial oxidation includes at least one fuel reservoir vessel; a reforming reactor; a CO shift reactor; a gas purifying unit; and a line to feed water from a water reservoir vessel into the reformate gas stream fed to the CO shift reactor. The water reservoir vessel contains a water-methanol mixture having a mixing ratio effective to ensure adequate frost protection.

5 Claims, 1 Drawing Sheet

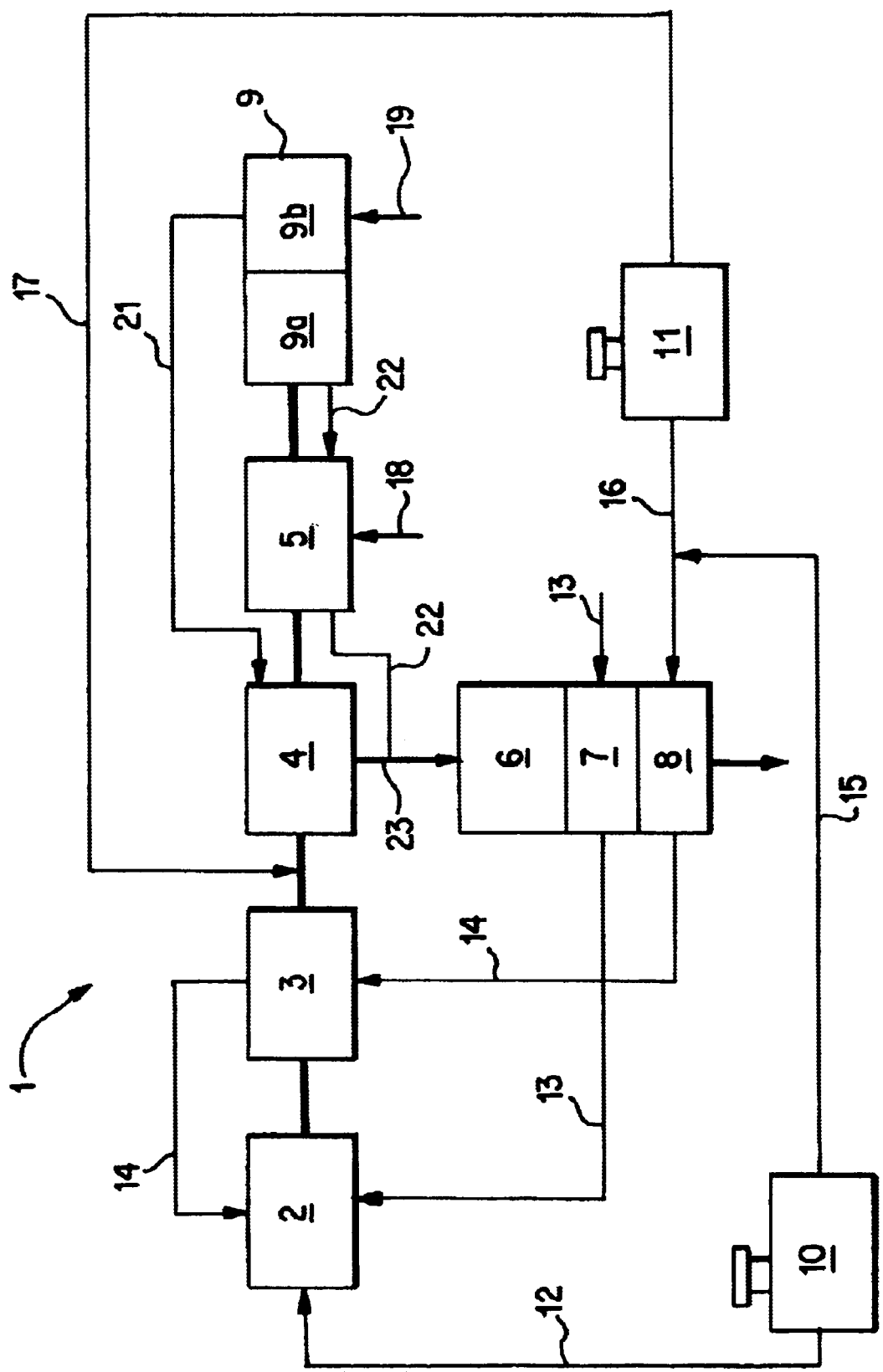

GAS GENERATOR

BACKGROUND AND SUMMARY OF THE INVENTION

This application claims the priority of German patent document 100 10 070.8-41, filed Mar. 2, 2000, the disclosure of which is expressly incorporated by reference herein.

The present invention relates to a gas generator.

Fuel cells are more energy efficient than internal combustion engines, which is why fuel cells are increasingly used for electricity generation. This includes both stationary and mobile applications. Fuel cells are customarily operated using hydrogen. Since hydrogen is difficult to store, attempts are being made in the case of mobile applications, such as motor vehicles, to store the hydrogen in the form of liquid motor fuels. Examples of such motor fuels are pure hydrocarbons and alcohols. Mobile applications today predominantly utilize methanol, which is split by a gas generator into hydrogen and $CO_2$. The hydrogen thus generated is then used to operate a fuel cell of a vehicle. However, disadvantages of using methanol are the still nonexistent methanol infrastructure and low storage density of methanol compared with petroleum-based motor fuels. Moreover, the high energy efficiency of a methanol fuel cell system is virtually cancelled out by the preceding methanol production. Hydrogen generation from conventional liquid power fuels such as gasoline, diesel or LPG is therefore an interesting alternative for a mobile fuel cell system. Such a fuel cell system comprises a fuel cell plus cooling media connection and air supply and also a gas generator.

U.S. Pat. No. 3,545,926 discloses a gas generator comprising a reforming reactor to produce a hydrogen-rich gas from a fuel, water and oxygen; a shift reactor to convert carbon monoxide with the aid of water into hydrogen; and a downstream gas-purifying unit. Both the reforming reactor and the shift reactor are supplied with water from an unspecified water reservoir vessel.

Such a gas generator has the disadvantage, especially in mobile use, for example when it is used to provide hydrogen for fuel cells in vehicles, that it needs to be provided with a water reservoir vessel which can freeze at ambient temperatures below freezing. Conventional antifreezes have a poisoning effect on reforming catalysts and so need to be removed prior to the metered addition, which represents an appreciable inconvenience and may even be impossible.

Against that background, it is an object of the present invention to provide a gas generator possessing reliable frost protection.

The present invention is based on the use of methanol as an antifreeze for the water reservoir vessel in a conventional gas generator. The water reservoir vessel has the function of providing water for the water gas shift reaction carried out in the shift reactor. Furthermore, in the case of gas generators which at least additionally perform steam reforming in the reforming reactor, the water reservoir vessel can also be used to supply the water for the steam reforming. The methanol can be used independently of the fuel used for the reforming reaction. That is, the reforming reaction itself may utilize methanol, but may also utilize any other suitable fuels, such as long-chain hydrocarbons and also higher alcohols, gasoline, diesel, LPG (liquefied petroleum gas) and NG (natural gas) or dimethyl ether.

The water reservoir vessel is thus stocked with a water-methanol mixture instead of pure water. Since the freezing point of such a water-methanol mixture depends on the mixing ratio, the desired degree of frost protection can be controlled by appropriately presetting a mixing ratio. The use of methanol as an antifreeze has the advantage that methanol can be converted into a hydrogen-rich gas in conventional shift reactors under customary operating conditions and over customary shift catalysts via a steam reforming reaction. This has the advantage not only of providing adequate frost protection and of protecting the catalysts against any damage, but also of improving the hydrogen yield in the gas generator.

The methanol in the water does not upset the reforming reactor either. When methanol is used as a primary fuel, the methanol in the water reservoir vessel will merely increase the methanol content in the reforming reactor. When other fuels are used, the methanol is converted into hydrogen at the same time as the actual fuel.

Other objects, advantages and novel features of the present invention will become apparent from the following detailed description of the invention when considered in conjunction with the accompanying drawing.

BRIEF DESCRIPTION OF THE DRAWING

The sole FIGURE shows a block diagram of a gas generator according to the present invention.

DETAILED DESCRIPTION OF THE DRAWING

With reference to the drawing, the gas generator 1 comprises a reforming reactor 2; a CO shift reactor 4; a CO purifier 5; a catalytic burner 6; vaporizer 8; and two heat exchangers 3, 7. The gas generator 1 has connected to it at least one fuel cell 9, which comprises an anode 9a and a cathode 9b. For clarity, the drawing depicts only a single fuel cell, but in practice the system will be provided with a fuel cell stack formed from a plurality of fuel cells. Also provided are a fuel reservoir vessel 10 and a water reservoir vessel 11.

As will be known, the reforming reactor 2 can generate hydrogen from a fuel by a partial oxidation reforming reaction, known as POX reforming, according to the equation:

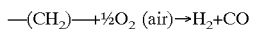

and/or the endothermic steam reforming reaction according to the equation:

A combination of the two processes is also possible, and this leads to autothermic modes of operation.

The reforming reactor 2 is operated with liquid and/or gaseous fuel and also atmospheric oxygen or water. To supply it with liquid fuel, the reforming reactor 2 is connected to the fuel reservoir vessel 10 via a line 12. There is also a line 13 to feed atmospheric oxygen to the reforming reactor 2. Finally there is a line 14 to supply a gaseous fuel-water mixture from the vaporizer 8. The vaporizer 8 is in turn connected via lines 15, 16 to the fuel reservoir vessel 10 and the water reservoir vessel 11. The line 14 between the vaporizer 8 and the reforming reactor 2 passes through the heat exchanger 3, so that the previously vaporized fuel-water mixture is supplied with further thermal energy in the heat exchanger 3 by means of the hot reformate gas stream emerging from the reforming reactor 2. The reformate gas stream, i.e. the hydrogen-containing gas with carbon monoxide fractions, is cooled in the process.

The reforming reactor 2 is packed with a suitable catalyst material, for example a noble metal catalyst. Depending on the reactant composition, the reforming reactor 2 is operated as a POX reactor, i.e. as a reactor for straight partial oxidation reforming reaction, or additionally as a steam reforming reactor, i.e. autothermally.

The hydrogen-containing reformate gas stream with carbon monoxide fractions passes through the two gas purifying units 4, 5. The first gas purifying unit 4 is a CO shift reactor and the second gas purifying unit 5 is preferably a reactor for the selective oxidation of carbon monoxide. However, the second gas purifying unit 5 can also be any other known apparatus, for example a membrane separator unit or a methanization stage. The two gas purifying units 4, 5 are connected in series, the reformate gas flowing through the CO shift reactor 4 first. Between the heat exchanger 3 and the CO shift reactor 4 is a line 17 via which so-called shift water from the water reservoir vessel 11 is introduced into the reformate gas stream. The hydrogen-rich reformate gas stream flows through the gas purifying units 4, 5 and subsequently to the fuel cell 9. In the CO shift reactor 4, the carbon monoxide is reacted with the shift water to form carbon dioxide and hydrogen. A conventional CO shift reactor 4 comprising known catalyst material is used. A further line 18 is provided to feed atmospheric oxygen to the second gas purifying unit 5.

The cathode 9b of the fuel cell 9 is supplied via a line 19 with oxygen-containing gas, preferably atmospheric oxygen, which, after passing through the cathode 9b, is removed again by a line 21. This line 21 for the exit air from the cathode 9b is passed through the CO shift reactor 4 to cool the CO shift reactor 4 and to preheat the exit air for combustion in the catalytic burner 6. The line 22 for the exit gas from the anode 9a is passed through the second gas purifying unit 5 to cool the gas purifying unit 5 and to likewise preheat the exit gas for combustion in the catalytic burner 6. The lines 21 and 22 merge in a connector 23 above the catalytic burner 6, so that the residual hydrogen in the anode exit gas is used as a fuel in the catalytic burner 6. However, it is also possible to feed additional atmospheric oxygen or else additional fuel, for example from the fuel reservoir vessel 10, into the catalytic burner 6.

Below the catalytic burner 6 is a vaporizer 8, which is operated using the hot exit gases from the catalytic burner 6. The vaporizer 8 can be supplied with the media as described via a single line 16 or else via separate lines. It is likewise possible to provide separate heat exchangers 7 for the water and the fuel. The heat exchanger 7 is disposed adjacent to the catalytic burner 6 and/or the vaporizer 8. Ambient air is introduced via the line 13 into the heat exchanger 7 and heated therein before it is passed via line 14 into the reforming reactor 2.

It will be appreciated that all lines 12–19 may be equipped with metering means. These are not depicted in the drawing for clarity. Moreover, instead of the atmospheric oxygen mentioned, any other desired oxygen-containing medium may be used.

Above the CO shift reactor 4 the hot gas stream is injected via line 17 with water from the water reservoir vessel 11, and the carbon monoxide in the CO shift reactor 4 is reacted with the shift water to form carbon dioxide and hydrogen. A conventional CO shift reactor with known catalyst material is used.

The water reservoir vessel 11, then, contains a water-methanol mixture instead of pure water. The freezing point of this water-methanol mixture depends on the mixing ratio, the freezing point decreasing with increasing methanol content. Therefore, the freezing of the water reservoir vessel 11 can be prevented by adding a suitable amount of methanol. That is, the desired degree of frost protection can be controlled via the mixing ratio. Frost protection down to −10° C. can be realized for example by adding just a small amount of methanol.

The use of methanol as an antifreeze has the advantage that it has no damaging effect on the catalyst in the CO shift reactor 4 and therefore need not be separated from the water either before introduction into the CO shift reactor 4. On the contrary, the pressure and temperature for a CO shift reaction correspond to the reaction conditions for a steam reforming of methanol. The catalyst materials used in CO shift reactors are therefore also active catalysts for the steam reforming of methanol. Therefore, the methanol in the water-methanol mixture is reacted in the CO shift reactor 4 by steam reforming reaction into a hydrogen-rich gas and so contributes to raising the hydrogen yield.

When a steam reforming reaction is to take place in the reforming reactor 2 too, the water-methanol mixture from the water reservoir vessel 11 can be used for this as well. The methanol has no upsetting effect on the reforming reactor 2 either. On the contrary, the methanol is likewise converted into hydrogen. It is completely immaterial in this connection whether it is likewise methanol or some other suitable fuel for the reforming reaction that is stored in the fuel reservoir vessel 10 and supplied from there to the reforming reactor 2.

Useful fuels include in particular long-chain hydrocarbons and also higher alcohols, gasoline, diesel, LPG (liquefied petroleum gas) and NG (natural gas) or dimethyl ether.

Although the process of the invention or the corresponding apparatus was described in this application preferentially in terms of a mobile application, the scope shall not be limited to a mobile application, but shall also extend to a corresponding application on stationary systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gas generator for generating a hydrogen-rich and carbon-monoxide-lean gas from at least one of a water-fuel mixture by catalytic steam reforming or an oxygen-fuel mixture by partial oxidation, said gas generator comprising:
   a reforming reactor;
   at least one fuel reservoir vessel for providing fuel to the reforming reactor;
   a CO shift reactor;
   a gas purifying unit;
   a line leading from a water reservoir vessel into a reformate gas stream between the reforming reactor and the CO shift reactor,
   wherein the water reservoir vessel contains a water-methanol mixture having a mixing ratio effective to ensure adequate frost protection.

2. A gas generator according to claim 1, wherein the fuel reservoir vessel contains methanol.

3. A gas generator according to claim 1, wherein the fuel reservoir contains gasoline, diesel, liquefied petroleum gas, natural gas, or dimethyl ether.

4. A gas generator according to claim 1, wherein the gas purifying unit is a CO selective oxidation unit, a membrane separator, or a methanization stage.

5. A method for producing a hydrogen-rich and carbon-monoxide-lean gas, said method comprising:

feeding fuel from at least one fuel reservoir vessel to a reforming reactor;

feeding at least one of oxygen or water from a water reservoir vessel to the reforming reactor;

performing at least one of partial oxidation of a fuel/oxygen mixture or water vapor reforming of a fuel/water mixture in the reforming reactor, thereby forming a reformate gas;

feeding the reformate gas to a CO shift reactor;

feeding water from the water reservoir vessel into the reformate gas before the CO shift reactor;

reacting carbon monoxide in the reformate gas with water in the CO shift reactor, thereby increasing a hydrogen content of the reformate gas; and feeding the reformate gas to a gas purifying unit;

wherein the water reservoir vessel contains a water-methanol mixture having a mixing ratio effective to ensure adequate frost protection.

\* \* \* \* \*